US006207055B1

(12) United States Patent
Satterfield et al.

(10) Patent No.: US 6,207,055 B1
(45) Date of Patent: Mar. 27, 2001

(54) METHOD AND APPARATUS FOR FORMING A SLURRY

(75) Inventors: Ronald J. Satterfield, Pocatello, ID (US); Thomas W. Yergovich, Lathrop, CA (US)

(73) Assignee: Idaho Research Foundation, Inc., Moscow, ID (US)

( * ) Notice: Subject to any disclaimer, the term of this patent is extended or adjusted under 35 U.S.C. 154(b) by 0 days.

(21) Appl. No.: 09/214,239

(22) PCT Filed: Jun. 16, 1997

(86) PCT No.: PCT/US97/10459

§ 371 Date: Aug. 30, 1999

§ 102(e) Date: Aug. 30, 1999

(87) PCT Pub. No.: WO98/00226

PCT Pub. Date: Jan. 8, 1998

(51) Int. Cl.[7] .................................................. C02F 3/00
(52) U.S. Cl. .................. 210/607; 210/610; 210/611; 210/614; 210/616; 210/622; 210/623
(58) Field of Search ..................................... 210/601, 607, 210/610, 611, 614, 615, 616, 620, 621, 622, 623

(56) References Cited

U.S. PATENT DOCUMENTS

| 1,073,878 | 9/1913 | Trent . |
| 1,135,080 | 4/1915 | Vandercook . |
| 1,156,946 | 10/1915 | Vandercook . |

(List continued on next page.)

FOREIGN PATENT DOCUMENTS

| 541 132 | 7/1932 | (DE) . |
| 43 05 820 | 2/1993 | (DE) . |
| 44 11 140 | 3/1994 | (DE) . |
| 42 34 111 | 4/1994 | (DE) . |
| 9407972 | 8/1994 | (DE) . |

(List continued on next page.)

OTHER PUBLICATIONS

Hinchee, Robert et al.; "Biological Unit Processes For Hazardous Waste Treatment", Third Internatl. In Situ And On–Site Bioreclaimation Symposium, San Diego, CA, Apr. 199, Battelle Press, vol. 3(9), pp. 129–135.

Primary Examiner—Chester T. Barry
(74) Attorney, Agent, or Firm—Wells, St. John, Roberts, Gregory & Markin, P.S.

(57) ABSTRACT

A slurry-forming apparatus and method of using the slurry-forming apparatus. In one aspect, the apparatus (122) comprising: a) a vessel, comprising: i) a cylindrical vessel wall (60, 160), the cylindrical vessel wall having an interior surface; ii) a downwardly-sloped floor joined to the vessel wall; an outlet in the downwardly-sloped floor; iii) and one or more baffles (172, 182) along the interior surface of the vessel wall; b) a fluid inlet opening (86) into the vessel and being configured for injecting a fluid into the vessel; c) a granular material inlet opening into the vessel and being configured for providing a granular material into the vessel; and d) the baffles, fluid inlet, granular material inlet and outlet being configured relative to one another whereby a slurry is formed from the injected fluid and provided granular material without substantial mechanical agitation of the vessel, and whereby the slurry exits the vessel through the outlet. In another aspect, a system for decontaminating soil comprises: a) a slurry-forming apparatus; b) a bioreactor vessel, the bioreactor vessel being configured to contain the contaminated soil slurry and to maintain microbial growth within the soil slurry, the microbial growth being utilized to remove a contaminant from the contaminated soil slurry; and c) one or more conduits, the conduits being in fluid communication with both the bioreactor vessel and the slurry-forming apparatus and thereby providing a substantially closed fluid transport between the bioreactor vessel and the slurry-forming apparatus.

25 Claims, 6 Drawing Sheets

U.S. PATENT DOCUMENTS

| | | |
|---|---|---|
| 1,924,126 | 8/1933 | Lofland . |
| 2,559,518 | 7/1951 | Smith . |
| 2,772,233 | 11/1956 | Nelson . |
| 2,886,297 | 5/1959 | Crandall . |
| 3,779,519 | 12/1973 | Anderson et al. . |
| 4,089,507 | 5/1978 | Arai et al. . |
| 4,179,220 | 12/1979 | Rippon . |
| 4,285,773 * | 8/1981 | Taciuk ................................. 202/100 |
| 4,610,547 * | 9/1986 | Bennett ............................... 366/270 |
| 4,696,741 | 9/1987 | Rahlwes . |
| 4,836,686 | 6/1989 | Sukup . |
| 4,951,417 | 8/1990 | Gerken et al. . |
| 5,064,292 | 11/1991 | Sutton . |
| 5,316,751 | 5/1994 | Kingsley et al. . |
| 5,387,271 | 2/1995 | Crawford et al. . |
| 5,413,713 | 5/1995 | Day et al. . |
| 5,474,380 | 12/1995 | Sukup . |
| 5,522,658 | 6/1996 | John . |
| 5,558,434 | 9/1996 | Hamada et al. . |
| 5,626,644 | 5/1997 | Northrop . |
| 5,628,563 | 5/1997 | Fisher . |

FOREIGN PATENT DOCUMENTS

| | | |
|---|---|---|
| 1418903 | 2/1966 | (FR) . |
| WO 90/10602 | 9/1990 | (WO) . |
| WO 93/06953 | 4/1993 | (WO) . |
| WO 96/05003 | 2/1996 | (WO) . |

* cited by examiner

METHOD AND APPARATUS FOR FORMING A SLURRY

TECHNICAL FIELD

The invention pertains to methods and apparatuses for forming a slurry. The invention is thought to have particular relevance to applications in which a contaminated soil is to be decontaminated through biological activity.

BACKGROUND ART

Major efforts are currently being expended to clean up contaminated soils throughout the United States and the world. Such contaminated soils typically arise as industrial products or by-products which are spilled either inadvertently or purposely into the environment. Commonly found contaminants are herbicides. pesticides, petroleum products and other hazardous industrial by-products. The time and expense involved in removing these contaminants from soil is frequently immense. Further, some soil types can exacerbate the problem by tightly binding with contaminants. Soils with a heavy clay content are frequently exceedingly difficult to decontaminate because of such binding actions.

Interestingly, in many contamination sites there will exist naturally-occurring microorganisms which have a capacity to aid in removal of the contaminant from the environment. Methods by which such micro-organisms can aid in removal of contaminants vary. Sometimes the contaminants are actually degraded, either partially or totally, by the microorganisms. Othertimes, the microorganisms can convert a contaminant to a substance which binds less tightly to the soil and is therefore easier to remove from the soil. In addition to the naturally-occurring microorganisms which may aid in removal of contaminants, non-naturally-occurring microorganisms may also be utilized. Such non-naturally-occurring microorganisms may sometimes be created by skilled scientists for the purpose of removing a contaminant from the environment. Example microorganisms which may be useful in remediating contaminated soils are described in U.S. Pat. No. 5,387,271, to Crawford et. at., entitled "Biological System For Degrading Nitroaromatics In Water And Soils," which is incorporated herein by reference.

In spite of the knowledge that naturally occurring and non-naturally-occurring microorganisms can aid in removal of contaminants from soils, and, in spite of frequent speculation that such microorganisms may be useful in remediating contaminated soil sites, it has been a considerable challenge to develop devices and procedures which can efficiently tap the utilities of such microorganisms. Among the problems faced are: 1) the microorganisms are frequently anaerobic so that oxygen must be substantially excluded from the environment of the microorganisms if they are to function efficiently; 2) the microorganisms, or some substance formed by the microorganisms, must generally contact a contaminant before the microorganisms can efficiently aid in removing the contaminant, so there must be efficient mixing of the microorganisms with a contaminated soil; and 3) the contaminated sites are generally enormous, possibly several square miles or larger in size. It is desirable therefore to develop methods and apparatuses which can be used in conjunction with microbiological activity to clean up contaminated soil sites.

Another set of problems facing those who would remediate contaminated soil sites concern the difficulties in preventing spillage of contaminated soil during the remediation process. Spilled contaminated soil may contaminate areas that were previously clean. Such spillage is particularly likely to occur during transport of the contaminated soil, as the soil may become a dust which is wind-blown to clean areas, or may be dribbled from open containers, or trucks, passing over the clean areas. Accordingly, it would be desirable to develop methods and apparatuses which minimize spread of contaminated soil from a remediation site during a remediation process.

Yet another set of problems facing those who would remediate contaminated soil sites arises from the remote locations of the sites. Frequently, such sites lack access to electrical power and lack nearby facilities for repair of broken equipment. Accordingly, it would be desirable to minimize the power requirements of decontamination apparatuses utilized at the sites, and to provide relatively durable decontamination apparatuses.

BRIEF DESCRIPTION OF THE DRAWINGS

Preferred embodiments of the invention are described below with reference to the following accompanying drawings.

BEST MODES FOR CARRYING OUT THE INVENTION AND DISCLOSURE OF INVENTION

This disclosure of the invention is submitted in furtherance of the constitutional purposes of the U.S. Patent Laws "to promote the progress of science and useful arts" (Article 1, Section 8).

In one aspect, the invention includes a remediation method wherein the spillage of contaminated soil at a soil remediation site is substantially inhibited, the remediation site comprising a substantially central area surrounded by an outlying area, the method comprising the following steps:

defining a plurality of slurry-forming apparatus locations throughout the substantially central area and the outlying area;

defining a bioreactor vessel locations within the central area;

providing one or more slurry-forming apparatuses at the slurry-forming apparatus locations and utilizing the one or more apparatuses to form a contaminated soil slurry from contaminated soil substantially proximate to the apparatuses;

providing a bioreactor vessel at the bioreactor vessel location; and transporting the contaminated soil slurry from the slurry-forming apparatuses to the bioreactor vessel through a first substantially closed conduit, the transporting of the soil slurry through the substantially closed conduit substantially inhibiting spillage of contaminated soil between the outlying area and the substantially central area.

In another aspect, the invention includes a method for forming and expelling a slurry, comprising the following steps:

providing a vessel, the vessel having a cylindrical vessel wall, a downwardly-sloped floor joined to the vessel wall and an outlet in the center of the downwardly-sloped floor; the cylindrical vessel wall having an interior surface and a top;

providing a first baffle along the interior surface of the vessel wall; the first baffle having a bottom surface and comprising a longitudinal slope whereby the first baffle has a higher end and a lower end;

providing a fluid inlet within the vessel;

injecting a fluid stream into the vessel through the fluid inlet, the fluid stream being injected at the bottom surface of the baffle whereby the majority of a fluid in the fluid stream is directed downwardly by the longitudinal slope of the baffle, the fluid being thereby sent into a downward and curvilinear flow along the interior surface of the vessel wall;

providing a granular material in the vessel;

mixing the granular material with the fluid having a downward and curvilinear flow to form a slurry; and flowing the slurry through the outlet of the vessel to expel the slurry.

In yet another aspect, the invention includes a slurry-forming apparatus, comprising:

a vessel, comprising;
a cylindrical vessel wall, the cylindrical vessel wall having an interior surface;
a downwardly-sloped floor joined to the vessel wall;
an outlet in the downwardly-sloped floor; and
one or more baffles along the interior surface of the vessel wall;

a fluid inlet opening into the vessel and being configured for injecting a fluid into the vessel;

a granular material inlet opening into the vessel and being configured for providing a granular material into the vessel; and the baffles, fluid inlet, granular material inlet and outlet being configured relative to one another whereby a slurry is formed from the injected fluid and provided granular material without substantial mechanical agitation of the vessel, and whereby the slurry exits the vessel through the outlet.

More specifically, the present invention pertains to methods and apparatuses for forming a slurry, and to methods and apparatuses for utilizing microorganisms to decontaminate a soil of a contaminated soil site. The invention is next described with reference to FIGS. 1–5.

Figure 1:
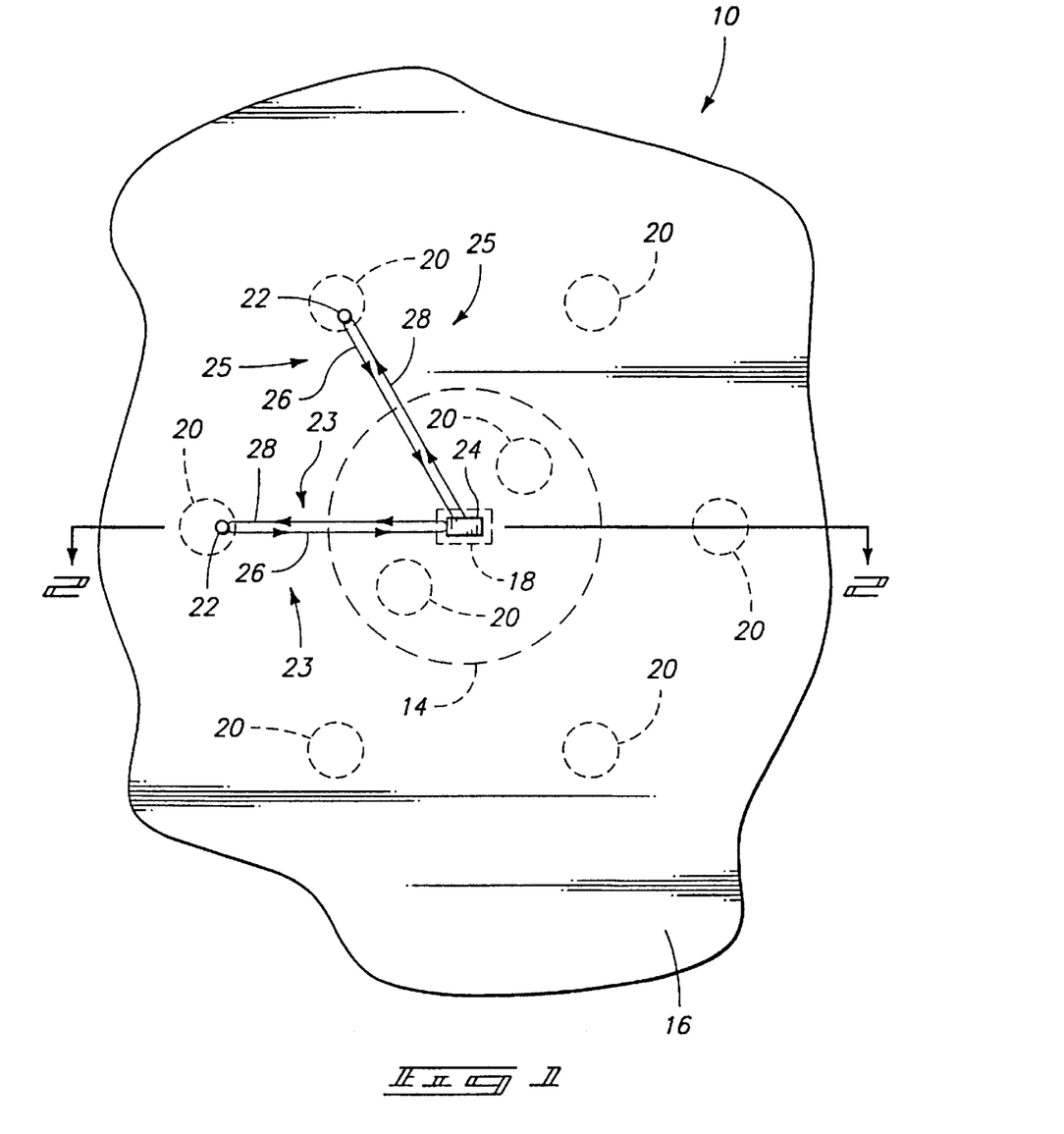
FIG. 1 is a schematic top view of a contamination site.

Referring to FIG. 1, a remediation site 10, treated according to systems 23 and 25 of the present invention, is illustrated. Remediation site 10 contains a contaminated soil and comprises a defined substantially central area 14 and a defined outlying area 16 outwardly of the substantially central area 14. Within the substantially central area 14 is defined at least one bioreactor vessel location 18. Within bioreactor vessel location 18 is a bioreactor vessel 24.

Scattered throughout the remediation site 10 are defined a plurality of slurry-forming apparatus locations 20. Preferably, the defined slurry-forming apparatus locations will be distributed throughout site 10 so that the slurry-forming forming apparatus locations are proximate to substantially all of the contaminated soil within site 10.

Preferably, one or more slurry-forming apparatuses 22 are placed within the slurry-forming apparatus locations 20 and utilized to convert contaminated soil to a slurry. As will be described in more detail below, the slurry-forming apparatuses 22 are configured to mix soil and water, and to thereby form a soil slurry. The slurry is then preferably transported through a conduit 26 to the bioreactor vessel 24.

In the shown embodiment, a pair of substantially closed decontamination systems 23 and 25 are provided over the site 10. The phrase "substantially closed" indicating that a contaminated material is substantially sealed from the environment adjacent the systems 23 and 25 while the material is being decontaminated. Each of the decontamination systems 23 and 25 comprises a slurry-forming apparatus 22, a pair of substantially closed conduits 26 and 28. and the shared bioreactor vessel 24. Bioreactor vessel 24 is preferably provided within a location substantially central to the locations of slurry-forming apparatuses from which slurry is provided to the bioreactor vessel 24. Also, as shown, the slurry-forming apparatuses 22 are preferably in fluid communication with the bioreactor vessel 24 through a pair of substantially closed conduits 26 and 28, with conduit 26 configured for transferring fluid from the slurry-forming apparatus to the bioreactor vessel 24, and conduit 28 configured for transferring fluid from the bioreactor vessel to the slurry-forming apparatuses 22. The purpose of the paired conduits 26 and 28 is discussed in more detail below with reference to FIG. 2.

Bioreactor vessel 24 is preferably configured as a reaction vessel wherein microorganisms are mixed with the slurry of the contaminated soil to aid in removal of contamination from the soil. Example constructions for bioreactor vessel 24 are, for instance, a pond lined with fluid impermeable material, and an above ground tank.

After the soil is decontaminated in vessel 24, the soil can be returned to the remediation site. Through repeated extraction of contaminated soil, decontamination of the soil, and returning of the decontaminated soil to the remediation site, the entire remediation site can be processed, hopefully to the point of substantially complete decontamination.

Among the advantageous aspects of the remediation systems 23 and 25 is that a single bioreactor vessel 24 can be utilized to clean a large amount of soil. Another advantageous aspect of the systems 23 and 25 is that the spillage of contaminated soil during transport to the vessel 24 is substantially inhibited because the soil is piped through a substantially closed conduit system, 26 and 28, rather than transported as a potentially dusty material in open trucks or containers. The systems 23 and 25 effectively substantially reduce the distance over which soil is transported in an open, easily spilled form. As the above-listed advantageous aspects indicate, the systems 23 and 25 may permit a single bioreactor vessel 24 to be utilized for cleaning a large remediation site 10 with substantially minimized spillage of contaminated soil during the remediation process.

The present invention of course contemplates various other embodiments which are not specifically shown. with the invention only being limited by the accompanying claims. For instance, more than one bioreactor vessel could be placed in the substantially central region, and more than the two shown slurry-forming apparatuses, or less than the two shown slurry-forming apparatuses may be used in conjunction with the bioreactor vessels. Also, a plurality of bioreactor vessels could be scattered beyond the substantially central area. Such embodiments are generally less preferable in that they may involve either: 1) establishing a plurality of the bioreactor vessels throughout an entire remediation site—and bioreactor vessels are generally expensive to build; or 2) transporting a soil slurry over a relatively large distance between a slurry-forming apparatus on one side of a remediation site to a bioreactor vessel on another side of the remediation site.

Figure 2:
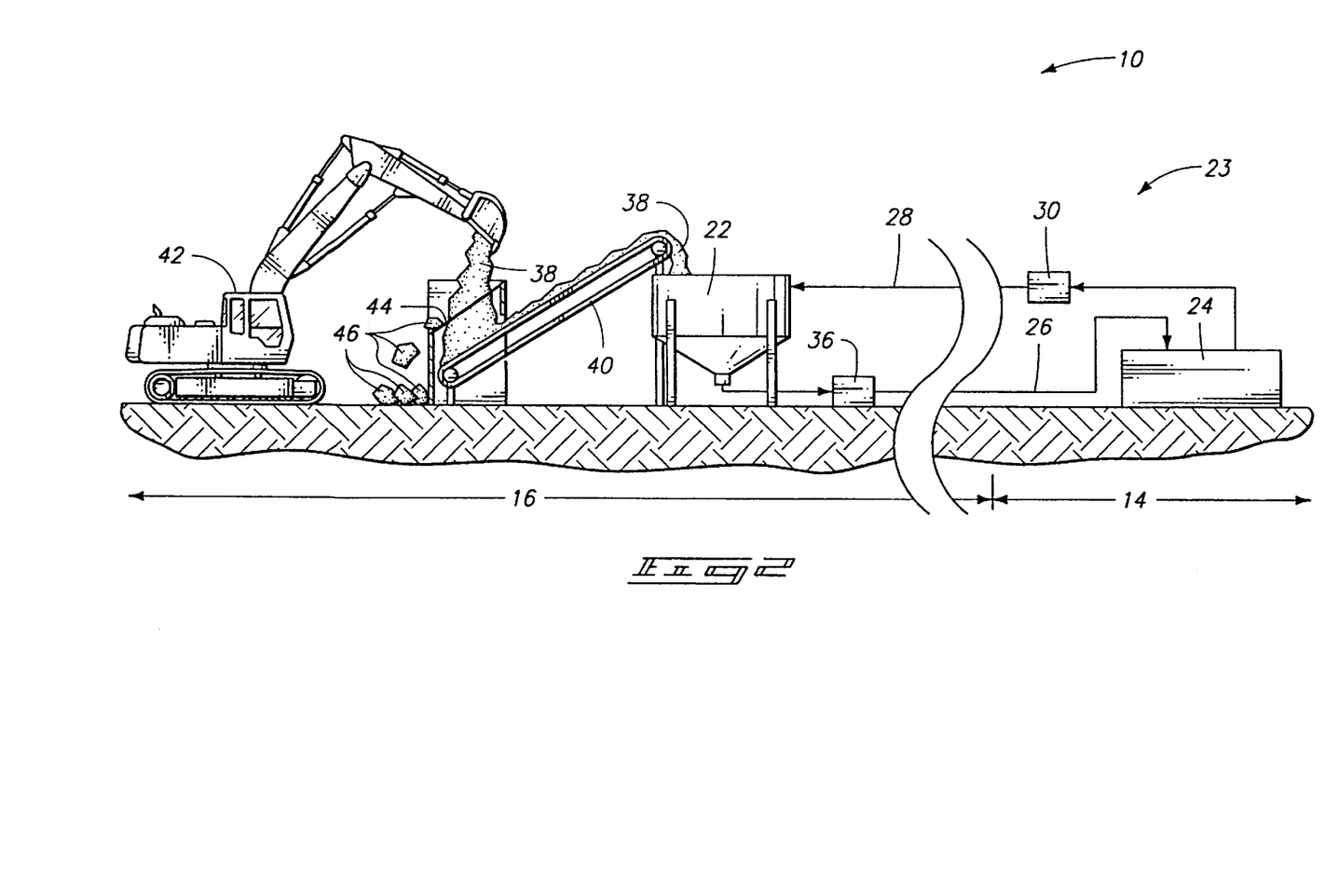
FIG. 2 is a sectional side view along line 2—2 of FIG. 1, illustrating a system for decontaminating a soil of the present invention.

A soil decontamination system of the present invention is illustrated in greater detail in FIG. 2. FIG. 2 shows a partial cross-sectional side view of the system 23, illustrating the bioreactor vessel 24 in fluid communication with the slurry-forming apparatus 22. Between vessel 24 and apparatus 22 is a pair of conduits, 26 and 28. Provided along the conduits 26 and 28 are a series of pumps 30 and 36, configured to transport a fluid, such as a slurry, through the conduits 26 and 28. Although one pump is shown along each of the conduits 26 and 28, it is to be understood that the number of pumps may vary depending various factors, including: the size of the pumps; the diameter of the conduits 26 and 28; and the distance between slurry-forming apparatus 22 and bioreactor vessel 24. Most preferably, however, there will only be the one pump 36 along conduit 26, and this pump will be as close as practicable to apparatus 22. Such use of one pump minimizes the distance over which a slurry is pulled from within conduit 26, and maximizes the distance it is pushed. It has been found that a slurry is travels better (for instance, with less plugging of the conduit) within conduit 26 when the slurry is pushed as opposed to when it is pulled. Preferably, a series of valves, not shown, will be between apparatus 22 and vessel 24 to control fluid flow along conduits 26 and 28.

The bioreactor vessel 24 is shown as an above-ground container, but other configurations of the bioreactor vessel may be utilized in the system of the present invention. as mentioned above. The bioreactor vessel 24 is preferably configured to contain a contaminated soil slurry and to maintain microbial growth within the soil slurry. The microbial growth can then be utilized to remove a contaminant from a contaminated soil slurry.

The contaminated soil slurry within bioreactor vessel 24 will preferably be mixed over the period during which microbial growth is maintained. Mixing devices for mixing the contaminated soil slurry may be configured with fluid inlets and fluid outlets. When such mixing devices are incorporated into the system of the present invention, the fluid inlets and fluid outlets of the mixing devices are preferably coupled with the conduits 26 and 28 for injecting fluid into, and removing fluid from, vessel 24. Such coupling can be preferred because the mixing device may be configured to extend completely across the bioreactor vessel 24 Accordingly, a slurry injected through the outlets of the mixing device will be evenly distributed within the bioreactor vessel 24.

The coupling of the mixing device to conduit 28 is most preferred if the mixing device is configured with self-cleaning screens over the fluid inlets. Self-cleaning screen permits fluid to be extracted from the vessel 24 while leaving behind particulate matter of the soil slurry. It is generally advantageous to have a fluid within conduit 28 which is substantially depleted of particulate matter because, as discussed below, the fluid is preferably used to form a soil slurry. By reducing the amount of particulate matter in the fluid before the formation of a slurry, the capacity of the fluid for soil during the formation of a slurry of a desired consistency is enhanced.

Conduit 28 is in fluid communication with the slurry-forming apparatus 22. Apparatus 22 is configured to form a contaminated soil slurry from a fluid, preferably water. separately provided or as recycle through conduit 28, and a contaminated soil 38. In the illustrated preferred embodiment of the invention, the contaminated soil is conveyed from adjacent the slurry-forming apparatus 22 to over the soil slurry-forming apparatus 22 with a conveyor 40. The contaminated soil 38 then falls from the conveyor 40 into the soil-forming apparatus 22. The contaminated soil 38 is generally transferred to conveyor 40 with an earth moving apparatus 42 configured to remove soil the earth and transfer it. In illustrated preferred embodiment, the soil 38 is passed through a screen 44 prior to its placement on the conveyor 40. Screen 44 removes boulders 46, roots (not shown) and other unmanageably bulky materials from the soil 38. Screen 44 thereby prevents such bulky materials from entering the soil-forming apparatus 22. Either the screen 44, or the conveyor 40, may be eliminated in less-preferred embodiments of the system.

As discussed previously, the soil transported to slurry-forming apparatus 22 will preferably be from a location proximate to the slurry-forming apparatus. Such proximate placement of apparatus 22 to the soil minimizes the distance over which soil may be spilled between the slurry-forming apparatus 22 and the removal location of the contaminated soil. Most preferably the proximate location of the contaminated soil will be within about 100 yards to about one mile of the slurry-forming apparatus 22, however, the distance can be significantly more or less depending on the number of pumps used and their sizes.

Once the contaminated soil enters slurry-forming apparatus 22, it is mixed with a fluid, preferably water. The fluid for slurry formation is preferably drawn from vessel 24 and transported to apparatus 22 through the substantially closed conduit 28. Once formed, the soil-slurry is then preferably transported through a substantially closed conduit 26 back to the vessel 24. Accordingly, fluid from bioreactor vessel 24 is cycled to apparatus 22 for forming a slurry which is then cycled back to the bioreactor vessel 24.

In less-preferred embodiments of the invention, the fluid entering slurry-forming apparatus can come from a source other than bioreactor vessel 24, such as, for example, a well, water truck, or other water supply. However, as the consistency of slurry within bioreactor vessel 24 is somewhat important in obtaining maximal efficiency from the system 23, it is advantageous to use the shown cyclic system of forming a slurry with bioreactor fluid so that the slurry can be iteratively brought to the appropriate consistency within vessel 24.

Among the reasons that the consistency of slurry within vessel 24 is important are that if the slurry is too thick, it will be exceedingly difficult to mix, and if it is too thin, it will take longer to treat all of the soil in a site because less soil will be treated at any given time. Empirically, it has been determined that about a 1:1 ratio (volume) of soil to water within the bioreactor vessel is about optimum. A preferred method for achieving this ratio of soil to water within the vessel is as follows.

First, the vessel is filled to between about one-quarter full and about one-half full with an initial amount of water.

Next, the water is pumped through substantially closed conduit 28 to the slurry-forming apparatus 22 wherein the water is mixed with contaminated soil 38 to form a soil slurry. It has been found that a slurry-forming apparatus of the present invention, which is discussed in greater detail below, optimally forms a slurry from a mixture of about 4:6 to about 6:4 (volume) soil to water. Thus, the slurry exiting soil-forming apparatus 22 will be about a 1:1 ratio of soil to water.

Subsequently, the slurry formed in apparatus 22 is transported through substantially closed conduit 26 back to bioreactor vessel 24.

Finally, the process of cycling water from the vessel to the apparatus and back is repeated until the proportion of soil to water in the bioreactor vessel is about 1:1.

Most preferably, the amount of water initially within vessel 24 will be somewhat low so that a slurry which is somewhat too thick is formed within the vessel 24. Also, most preferably, the vessel 24 will not be completely filled with this too thick slurry, but instead a volume of the vessel will be left for adding additional water or fluid to the vessel to bring the slurry within the vessel to the appropriate consistency for microbial decontamination.

In a preferred system 23, the contaminated soil 38 and any contaminants released from the soil 38, are substantially contained during the operation of system 23. Accordingly, the conduit systems 26 and 28 are preferably substantially closed conduits comprising, for example, tubes or pipes, which thereby prevent slurry or fluid from spilling during transport between apparatus 22 and vessel 24. Preferably, conduits 26 and 28 are flexible hoses having an internal diameter of from about 3 inches to about 8 inches. Most preferably, conduit 26 has an internal diameter of about 6 inches, and conduit 28 has an internal diameter of about 4 inches.

Figure 3:
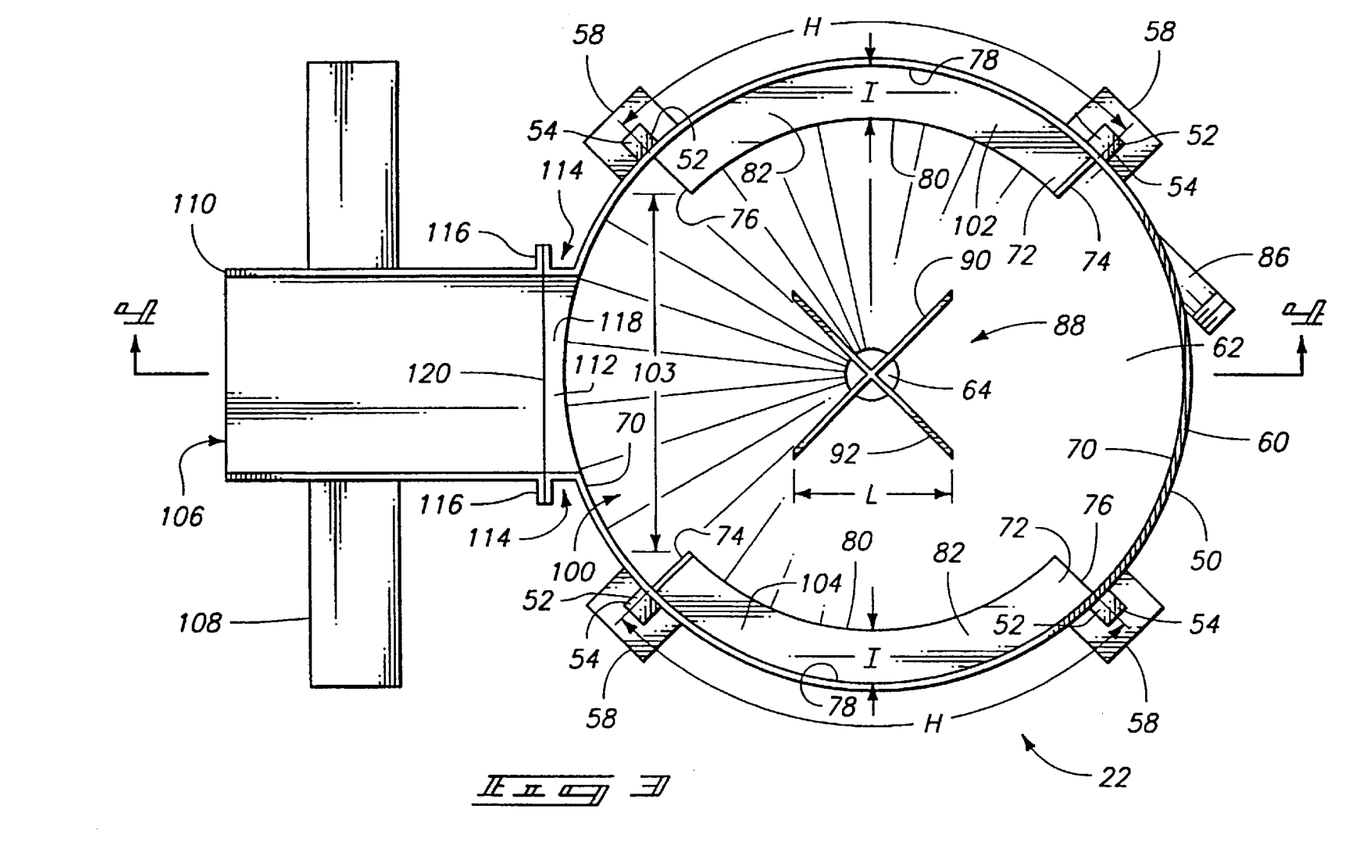
FIG. 3 is a top view of a first embodiment of a slurry-forming apparatus of the present invention.
Figure 4:
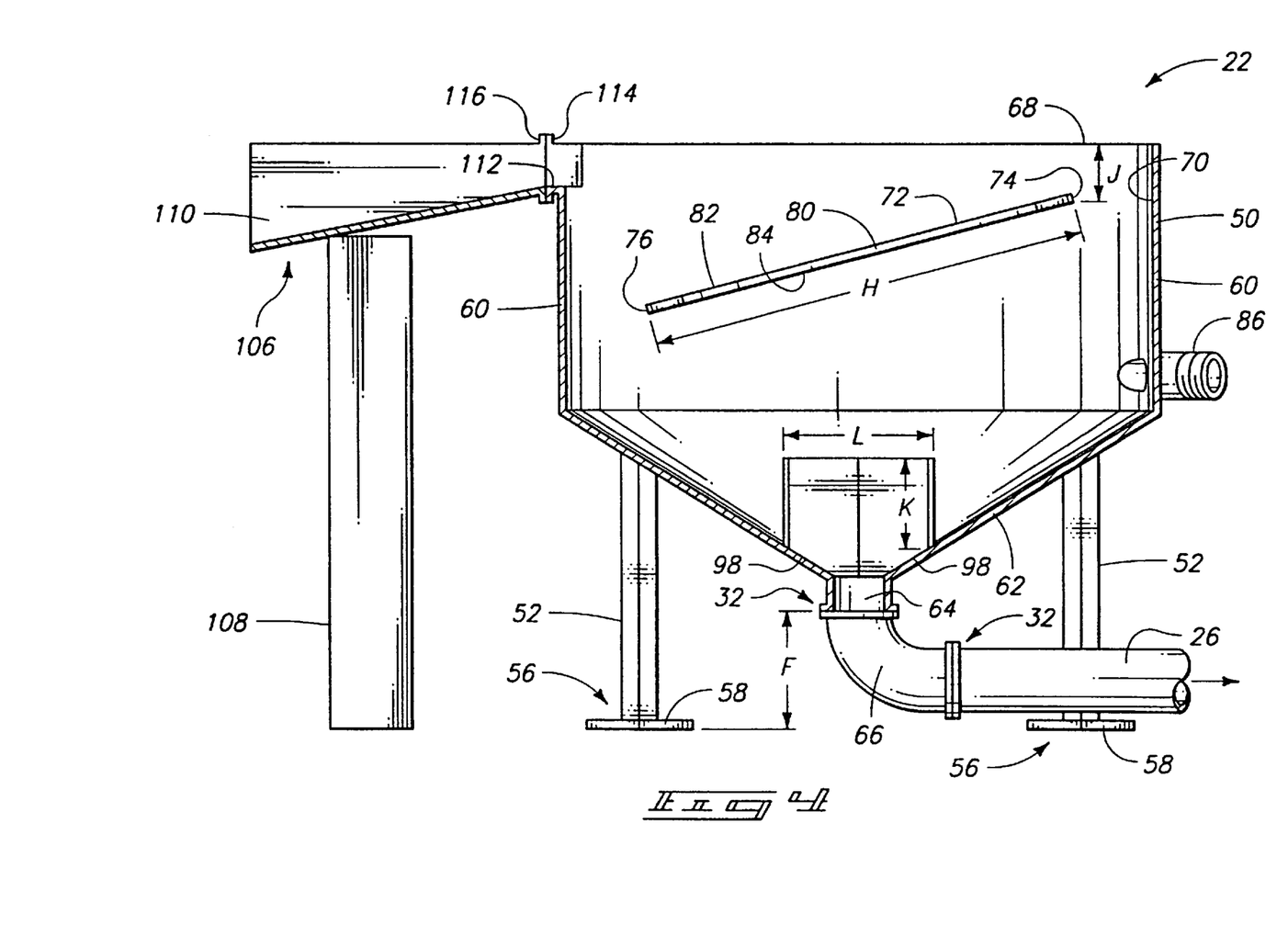
FIG. 4 is a sectional side view through section 4—4 of FIG. 3.
Figure 5:
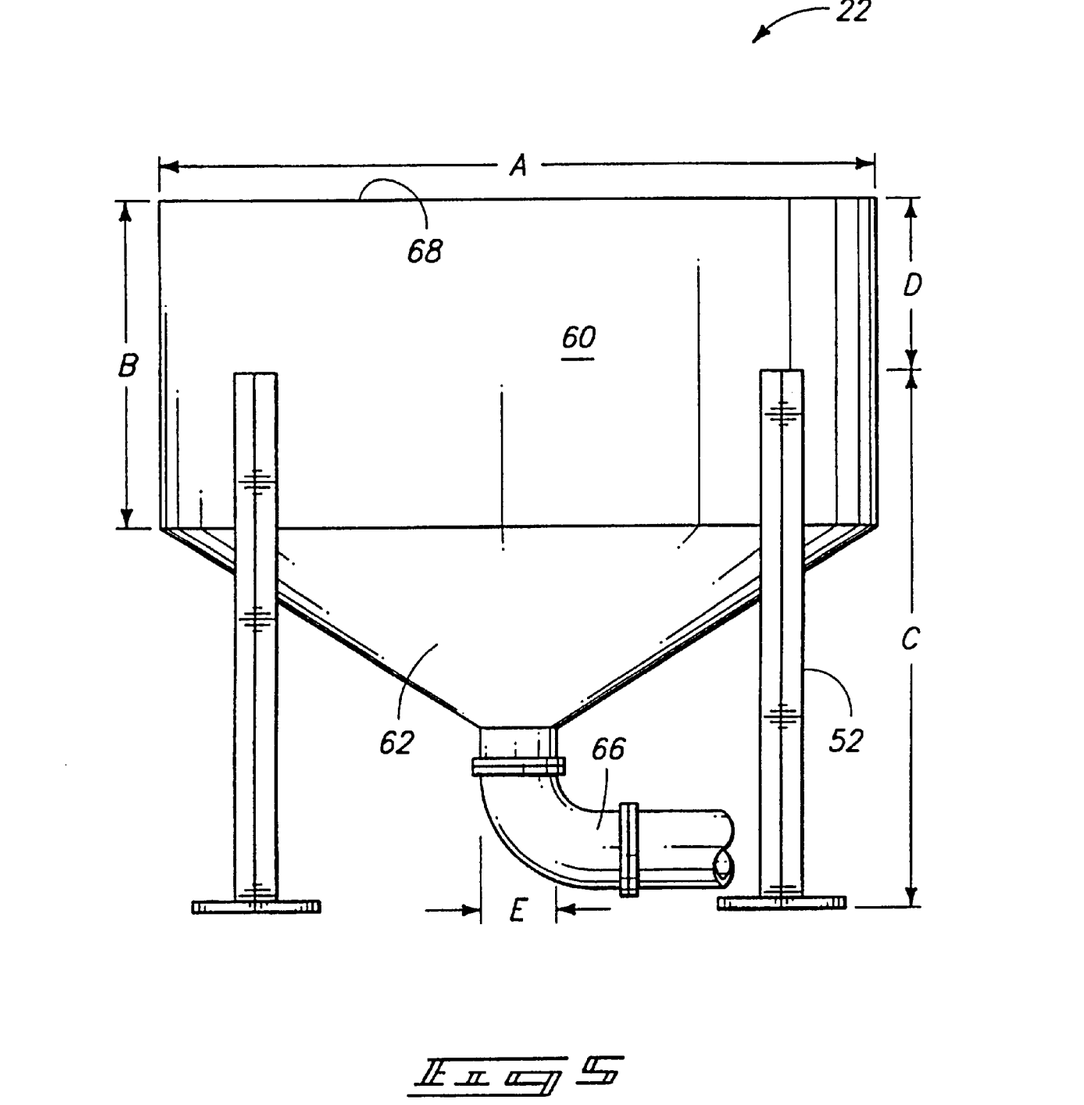
FIG. 5 is a side view of a slurry-forming apparatus of the present invention.

The rate at which a slurry is provided within vessel 24 is determined, at least in part, by the rate of slurry formation within apparatus 22. An example preferred slurry-forming apparatus of the present invention, discussed below with reference to FIGS. 3–5, is capable of forming slurry from about 20 to about 160 tons of soil per hour. At the preferred 1:1 ratio of soil to water, this corresponds to an hourly production of soil slurry of from about 4400 gallons to about 35,200 gallons. This slurry will preferably be flowed through the conduit 26 at a minimum rate of about 16 feet per second to prevent soil from settling from the slurry and plugging the conduit 26. As the bioreactor vessel 24 will typically hold about 300,000 gallons of fluid, the slurry-forming apparatus of the present invention will generally fill a bioreactor vessel 24 within about 8 hours, when operating at about the maximum capacity.

The distance between a soil slurry-forming apparatus 22 and a bioreactor vessel 24 will vary depending on the size of site 10 and the number of slurry-forming apparatus locations 20 (shown in FIG. 1) relative to the number of bioreactor vessel locations 18 (shown in FIG. 1). A typical distance for transporting contaminated soil from a slurry-forming apparatus to a bioreactor vessel is generally from about 100 yards to about one mile.

It is noted that other ingredients, besides a soil slurry, will generally be provided to the bioreactor vessel 24 to initiate and maintain a microbial decontamination reaction within the vessel. These additional ingredients may include: nutrient, buffers, and an inocula of microorganisms. Preferably, the system 23 is utilized to provide such additional ingredients to the bioreactor vessel 24. Such utilization of system 23 generally involves transporting the additional ingredients to within the slurry-forming apparatus 22, utilizing the apparatus 22 to mix the ingredients with a fluid to form a mixture, and subsequently transporting the mixture through the substantially closed conduit 26 to the bioreactor 24.

For example, the system 23 may be used for providing a buffer to vessel 24. The buffer, typically in the form of a dry powder, is mixed with water within the slurry-forming apparatus 22 to form a buffer solution. This buffer solution is then transferred through conduit 26 to vessel 24.

As another example, the system 23 may be used for providing an inocula of microorganisms to vessel 24. The inocula, typically in the form of a mixture of microorganisms and soil, is mixed with water in the slurry-forming apparatus 22 and subsequently transferred through conduit 26 to vessel 24. It has been found that when the inocula comprises a mixture microorganisms in soil, the method of this example is a preferable method for inoculating a solution within the bioreactor vessel 24 with microorganisms.

Referring to FIGS. 3–5, the preferred slurry-forming apparatus 22 is next described in detail.

In the shown embodiment, the apparatus 22 comprises a vessel 50 and support members 52 configured to support vessel 50 above the ground. Support members 52 preferably comprise an upper end 54 and a lower end 56. Upper ends 54 are preferably attached to vessel 50 and lower ends 56 are preferably attached to pads 58.

The vessel 50 is preferably constructed of metal, which is most preferably about one-half inch thick. However, the vessel may also be constructed from plastic, wood, or other substantially fluid impermeable materials. Support members 52 are preferably constructed from metal and preferably comprise 6" angle iron. However, support members 52 may be constructed from any material capable of supporting the vessel 50. Pads 58 are preferably constructed from metal, and preferably comprise a thickness of one-half inch. Although preferably formed of metal, pads 58 may be constructed from any material capable of serving as a base for support structure 52, including wood and plastic. A function of pads 58 is to distribute the weight of vessel 50 across a wider surface than the bottom of support structures 52 to thereby inhibit the apparatus 22 from sinking into a soft soil.

Vessel 50 comprises a cylindrical vessel wall 60 and a downwardly-sloped floor 62 joined to the vessel wall 60. Preferably, downwardly-sloped floor 62 comprises the shown frustoconical-shape. Within the downwardly-sloped floor 62 is an outlet 64. Outlet 64 is in the center of the frustoconically-shaped floor 62 and is in fluid communication with a slurry conduit 26.

As discussed above, slurry conduit 26 will preferably comprise a flexible tube having about a six inch internal diameter. A preferred embodiment of the invention comprises an elbow 66 configured to connect a conduit 26, having a six inch internal diameter, to an outlet 64, having a six inch internal diameter, with a substantially constant internal diameter between the conduit 26 and the outlet. This may be accomplished, for example, by the shown flanged coupling units 32. Through such coupling units 32 and elbow 66, the slurry conduit 26 may be sealingly attached to the vessel 50. Also, a valve, not shown, will preferably be placed between conduit 26 and elbow 66. Such a valve permits the flow of slurry to be stopped relatively immediately downstream of apparatus 22 during, for instance, maintenance of pump 36 or conduit 26.

Referring to FIG. 5, some preferred dimensions of the apparatus 22 are described. Cylindrical vessel wall 60 preferably has a diameter "A" of from about 5 feet to about 7 feet, with about six feet being most preferred. Cylindrical vessel wall 60 also preferably has a length "B" of about from 4 feet to about 8 feet, with about 6 feet being most preferred. The support members 52 have a preferred length "C" of from about 2 feet to about 4 feet, with about 3 feet being most preferred. The upper ends 54 of support members 52 are preferably at a distance "D" from a top 68 of vessel 50 of from about one half foot to about 3 feet, with about 2 feet being most preferred. The outlet 64 preferably terminates at a distance "F" above the ground (shown in FIG. 4), with "F" preferably being from about 12 inches to about 24 inches, with about 19 inches being most preferred. Also, outlet 64 preferably has a diameter "E" of from about 5 inches to about 15 inches, with about 6 inches being most preferred.

Referring to FIGS. 3 and 4, vessel 50 comprises an interior surface 70 and an inner circumference extending curvilinearly around the interior surface 70 of the vessel wall 60. Most preferably, as shown, the inner circumference of vessel wall 60 remains constant along the entire length "B" (shown in FIG. 5) of the wall 60.

Along the interior surface 70 are one or more baffles 72, and most preferably two baffles; a first baffle 102 and a second baffle 104. Each of the baffles 72 comprises a baffle end 74, an opposite opposing baffle end 76, an outer edge 78, an inner edge 80, an upper surface 82, and a bottom surface 84. The baffles further comprise an arcuate length "H" from the baffle end 74 to the opposite opposing baffle end 76, and a radially oriented width "I" from the outer edge 78 to the inner opposing edge 80. In a preferred embodiment of the invention, cylindrical vessel wall 60 comprises an internal diameter of about six feet and each of the two baffles 72 has a radially oriented width "I" of less than about one-tenth of the internal diameter of vessel wall 60, and most preferably of about six inches.

The arcuate length "H" of baffles 72 is preferably equal to about one-fourth of the inner circumference of the vessel wall 60. Most preferably, the first and second baffles 102 and 104 each comprises about an identical arcuate length "H" which is about equal to one-fourth of the inner circumference of the cylindrical vessel wall. Also, most preferably the first and second baffles 102 and 104 are circumferentially spaced from one another by about a distance of one-fourth the inner circumference of vessel wall 60. In less preferred embodiments, the baffles 72 may comprise varying lengths and may be separated by unequal distances.

Baffles 72 are preferably formed from a relatively rigid, fluid-impermeable material, such as metal, wood or plastic. The baffles may be mounted to the interior surface of vessel wall 60 by a number of methods known to persons with skill in the art. Such methods include: welding, adhesion with glue, and adhesion with penetrating fasteners such as screws, bolts or nails.

In the shown embodiment, each baffle 72 comprises a longitudinal slope so that opposing end 74 is higher than opposite opposing end 76. Preferably the longitudinal slope will not be 90° from level, more preferably the slope will be from about 10° to about 20° from level, and most preferably the longitudinal slope will be about 15° from level. Also preferably, the higher end 74 is a distance "J" (shown in FIG. 4) from the top 68 of vessel 50. Preferably, "J" is from about 3 inches to about 9 inches, and most preferably "J" is about 6 inches. In a most preferred embodiment of the invention, the higher end 74 of each of the two baffles 72 is about an equal distance "J" from the top 68 of vessel.

A fluid inlet 86 opens into vessel 50 and is configured for injecting a fluid into the vessel. Fluid inlet 86 will most preferably comprise a tube having about a 4 inch internal diameter. In the shown embodiment, vessel inlet 86 extends through the cylindrical vessel wall 60 and terminates flush with the inside of the vessel wall. Other configurations for providing a fluid inlet within vessel 50, will be recognized by persons skilled in the art. Such methods include, for example, running a tube or hose over the top of vessel 50 and along the interior surface 70 of the vessel to provide the inlet within the vessel. Preferably, fluid inlet 86 is connected to conduit 28 through a flanged coupling unit analogous to the flanged coupling units 32. Also preferably, a valve is positioned between pump 30 and inlet 86, most preferably between the inlet an conduit 28.

Preferably, fluid inlet 86 is oriented to inject a fluid into vessel 50 and substantially horizontally, and substantially perpendicular to a radius of the cylindrical vessel wall 60. The injected fluid preferably swirls within the vessel 50, and preferably is maintained at a level within the vessel which is a couple of inches above the top surface 82 of a baffle 102. The swirling fluid is directed downwardly by the longitudinal slope of baffle 102 into the vessel 50. As the fluid is directed downwardly by baffle 102, the cylindrical vessel wall 60 further directs the fluid curvilinearly within the vessel 50. Accordingly, in a most preferred embodiment of the invention, a fluid is injected from fluid inlet 86 and is directed into a curvilinear downward flow within the vessel 50.

At the bottom of vessel 50, over the outlet 64. is provided a vortex breaker 88. Vortex breaker 88 comprises a pair of perpendicular members 90 and 92 which extend across outlet 64. The perpendicular members 90 and 92 cross at about a center of outlet 64. The vortex breaker 88 is preferably configured to be complementary to the downwardly-sloped floor 62 of vessel 50, as shown in FIG. 4. Accordingly, the vortex breaker 88 preferably comprises sloped portions 98 which have a slope parallel to a slope of downwardly sloped floor 62.

Vortex breaker 88 is preferably formed from a substantially rigid material such as wood, plastic or metal. Vortex breaker 88 may be mounted to vessel 50 by a number of methods known to persons with skill in the art, including: welding, adhesion by glue, and adhesion by fasteners such as screws, bolts and rivets.

A function of vortex breaker 88 is to interrupt the downward curvilinear flow of fluid within vessel 50 and to thereby enhance the mixing of solid particles and fluid within the vessel 50. Vortex breaker 88 may thus enhance slurry formation. Vortex breaker 50 preferably comprises a minimum thickness dimension "K" (FIG. 4) of from about 8 inches to about 20 inches, and most preferably of about 14 inches. The vortex breaker also preferably comprises a length "L", of from about 12 inches to about 24 inches, and most preferably of about 18 inches.

Apparatus 22 further comprises a granular material inlet 100 (FIG. 3) which opens into vessel 50 and which is configured for provision of a granular material into the vessel 50. In the shown preferred embodiment, the granular material inlet comprises the open top of vessel 50. Preferably, the granular material inlet will be provided in a region 103 (FIG. 3) which extends between the two baffles 72 and which extends from the interior surface 70 of vessel wall 60 to less than about one-third of the internal diameter of vessel wall 60. It is generally undesired to provide granular material directly over opening 64, as the granular material is likely to exit from vessel 50 before it has been substantially converted to a slurry. Also, it is generally undesired to have the granular material inlet directly over one of the baffles 72, as the granular material tends to accumulate on the baffle rather than mixing into a slurry.

As mentioned above, in operation the a fluid injected into vessel 50 preferably is directed substantially downwardly and substantially curvilinearly along the interior surface 70 of vessel 50. Some of the injected fluid most preferably flows above the first baffle 102, and most preferably flows about 1 to 2 inches above the first baffle 102. Accordingly, in operation there is preferably a fluid level within vessel 50 which most preferably has an upper surface that is about an inch or two above the top surface 82 of first baffle 102. Due to the cylindrical configuration of vessel 50 and the pressure of injection of fluid within the vessel, the fluid swirls curvilinearly within vessel 50 and approaches upper end 74 of the second baffle 104. As discussed previously, second baffle 104 will most preferably have a 15° slope identical to the slope of first baffle 102. Accordingly, the fluid approaching second baffle 104 will be generally forced downwardly by the longitudinal slope of second baffle 104.

As the above discussion indicates, a net effect of the two baffles 72 and cylindrical wall 60 is to force a fluid within apparatus 22 in a downward curvilinear flow. The downward curvilinear flow of the fluid is substantially countered, however, by the vortex breaker 88 at the bottom of the vessel 50 so that a vigorous mixing action occurs within the vessel to thereby form a slurry. Once formed, the slurry eventually finds a way to the outlet 64, whereby the slurry exits the vessel 50.

When a soil slurry is formed with apparatus 22, soil will preferably be mixed with the fluid water. The rates of water flow and soil flow will preferably be controlled to maintain a ratio of soil to water within the apparatus in a range of from about 4:6 to about 6:4, at which range it has been found that the most efficient slurry formation occurs. At higher ratios of soil to water, the slurry tends to be thick and accordingly difficult to flow through conduit 26. At lower ratios of soil to water, the soil-slurry tends to be thin such that it takes longer to make a quantity of slurry then it does at the preferred ratios.

An example preferred water injection rate for forming a soil slurry in the shown apparatus 22 is from about 7000 gallons/hour to about 20,000 gallons/hour, and a most preferably is about 13,000 gallons/hour. An example preferred soil provision rate for the apparatus 22 is from about 900 cubic feet/hour to about 2700 cubic feet/hour.

After the slurry is formed, it exits vessel 50 at a slurry removal rate. The slurry removal rate can be controlled somewhat by having the slurry enter a conduit 26 which is connected to a pump, and controlling the pumping rate. Preferably, the slurry removal rate and the fluid injection rate are controlled to maintain a substantially constant volume of fluid within the vessel, with the top of the fluid at the most preferred level discussed previously. Under such preferable conditions, a substantially continuous stream of slurry may be formed with the apparatus. A preferred slurry removal rate is 16 feet per second.

Due to the contaminated nature of the soil entering slurry-forming apparatus 22, the fluid within the apparatus is generally contaminated. Thus, it is most preferred that the slurry removal rate and fluid injection rate be controlled to substantially prevent fluid from spilling over the top of vessel wall 60. The spill-over of contaminated fluid from vessel 50 can also be substantially reduced by increasing the distance "J" from the top of baffles 72 to the top 68 of vessel 50.

In the embodiment shown in FIGS. 3 and 4, a safeguard device is attached to the apparatus 22 to channel fluid overflow and to thereby reduce the risk of uncontrolled spill-over of contaminated fluid from the apparatus 22. Safeguard device 106 consists of a support structure 108 and a trough 110. Trough 110 is configured a direct overflow fluid from vessel 50 into a desired location (not shown). Vessel 50 is fluidly connected to trough 110 through a notch 112 in the wall 60 of vessel 50. Vessel 50 comprises a pair of flanges 114 adjacent notch 112 and configured for connecting to a flange 116 joined to trough 110. A fluid channel 118 extends from notch 112 under an upper portion 120 of flange 116 and along trough 110.

Figure 6:
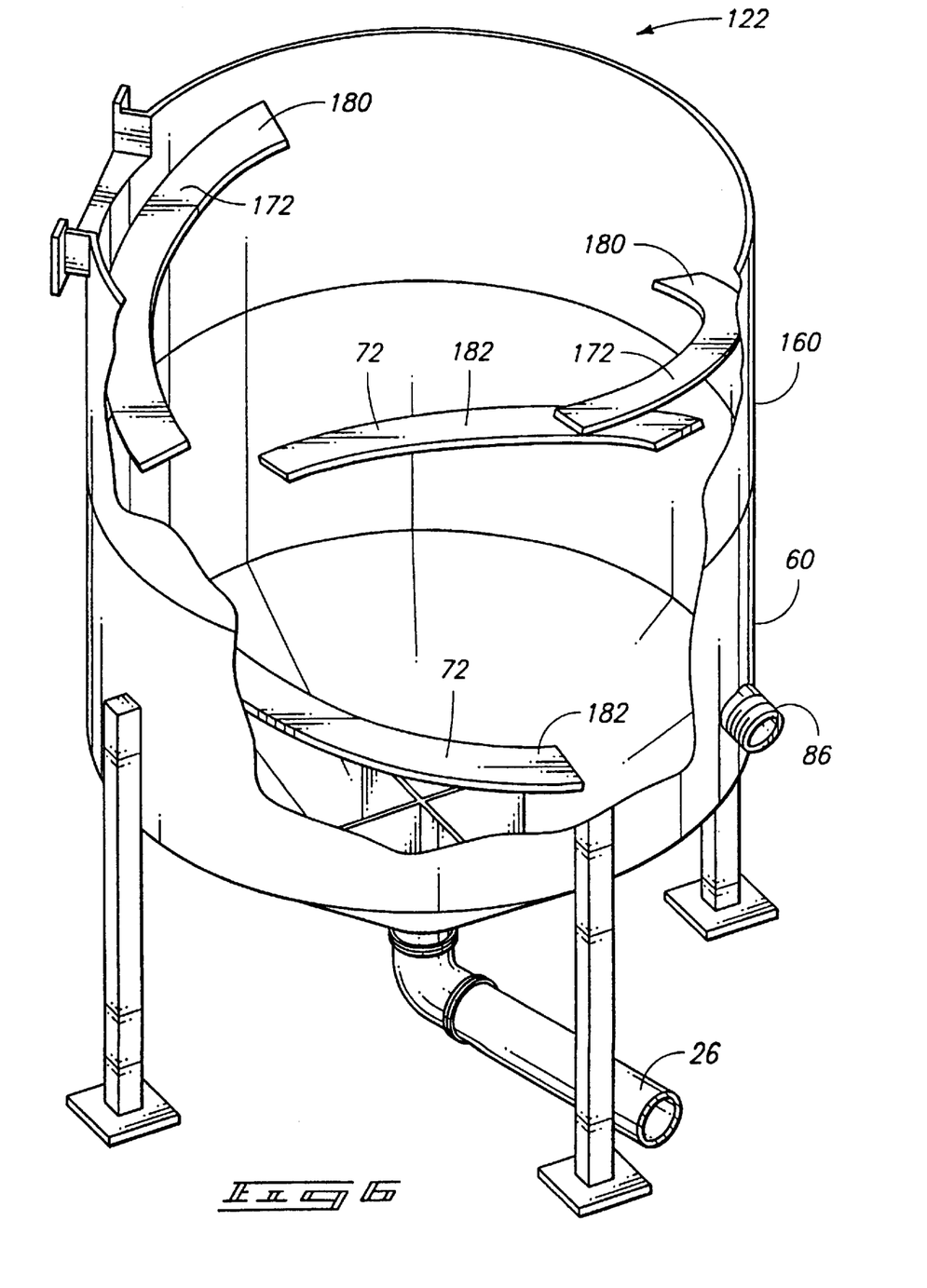
FIG. 6 is a partially cut-away, perspective view of a second embodiment of a slurry-forming apparatus of the present invention.

Referring to FIG. 6, a second embodiment slurry-forming apparatus 122 is illustrated. Apparatus 122 is a preferred embodiment of the invention and comprises four baffles 172 spaced circumferentially within the apparatus. The apparatus 122 may be thought of as being formed by stacking a second cylindrical wall 160 of length "B" (length "B" is shown in FIG. 5) atop the first cylindrical wall 60 shown in FIGS. 4 and 5. The second cylindrical wall 60 preferably comprises the same preferable construction as the first vessel wall 60, discussed above, and preferably has a pair of baffles 172 attached within an interior of the wall 160 in the same preferred orientation illustrated for baffles 72 within wall 60 (the preferred orientation of baffles 72 within wall 60 is shown in FIG. 4). The second cylindrical wall 160 is preferably rotated 90° relative to wall 60. Thus, the apparatus 122 comprises an upper pair of baffles 180 and a lower pair of baffles 182, with the upper pair of baffles being circumferentially displaced relative to the lower pair of baffles.

In the shown preferred embodiment, there is no granular material opening analogous to the opening 103 (shown in FIG. 3) which is not over a baffle, so the granular material is generally input over a baffle. As discussed previously regarding the vessel 22, this may create some problems with granular material accumulating on a baffle. However, ideally the fluid level within apparatus 122 will be maintained within a few inches of upper baffles 180, so if granular material is input over lower baffles 182 the granular material generally will not accumulate on the baffles.

A slurry-forming apparatus of the present invention is thought to be particularly well adapted to soil remediation processes in that the apparatus does not required substantial mechanical agitation to form a slurry. Accordingly, there is no need for moving mechanical parts, in the apparatus itself, which may substantially reduce the likelihood of wear of the apparatus, thereby potentially increasing the usable lifetime of the apparatus and reducing the need for repair of the apparatus. Also, the lack of moving mechanical parts effectively eliminates a need to provide power to the apparatus of the present invention, which may make the apparatus particularly suitable for use in remote locations. Additionally, the durable, effectively one-piece construction of the preferred apparatus may enable the apparatus to be transported to varying locations in a remediation site and utilized with minimal set up effort.

It is noted that an apparatus of the present invention may have utility beyond soil-slurry formation. For instance, it has been found experimentally that the apparatus may have utility for washing a soil. Specifically, a contaminated soil subjected to mixing within the slurry-forming device of the present invention can sometimes be washed of contaminate to form a relatively decontaminated soil and a contaminated wash solution. In such cases, the relatively decontaminated soil can be separated from the wash solution and returned to the environment. The wash solution can then be transferred, for example, through a conduit system, to a bioreactor vessel wherein the solution is treated to remove contamination. This process would be advantageous over processes wherein an entire soil-slurry is transferred to a bioreactor vessel, in that it is generally more expedient to treat a fluid than a slurry, and in that it is generally easier to transfer a fluid through a conduit system than to transfer a slurry through a conduit system.

It is also noted that an apparatus of the present invention could have applicability to any applications in which it is desired to eliminate moving mechanical parts from a slurry-forming apparatus. Additionally, the apparatus may have application to systems in which mixing is to be done, even if such mixing is to form something other than a slurry.

In compliance with the statute, the invention has been described in language more or less specific as to structural and methodical features. It is to be understood, however that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for forming and expelling a slurry, comprising the following steps:

providing a vessel, the vessel having a cylindrical vessel wall, a downwardly-sloped floor joined to the vessel wall and an outlet in about the center of the downwardly-sloped floor; the cylindrical vessel wall having an interior surface and a top;

providing a first baffle along the interior surface of the vessel wall; the first baffle comprising a longitudinal slope;

providing a fluid inlet to within the vessel;

injecting a fluid stream into the vessel through the fluid inlet, the fluid stream being directed downwardly by the longitudinal slope of the baffle, the fluid being thereby sent into a downward and curvilinear flow along the interior surface of the vessel wall;

providing a granular material in the vessel, wherein the granular material is a contaminated soil;

mixing the granular material with the fluid having a downward and curvilinear flow to form a slurry; and flowing the slurry through the outlet of the vessel to expel the slurry.

2. The method of claim 1 wherein the fluid stream is injected in a direction substantially perpendicular to a radius of the cylindrical vessel wall.

3. The method of claim 1 further comprising providing a vortex breaker over the floor of the vessel.

4. The method of claim 1 wherein the step of providing a granular material comprises dropping the granular material into the vessel over the vessel top.

5. The method of claim 1 wherein the step of providing a granular material comprises dropping the granular material into the vessel and wherein the granular material is conveyed over the top of the vessel on a conveyor and thereafter dropped into the vessel.

6. The method of claim 1 wherein a second baffle is provided and wherein the cylindrical inner wall has a circumference, the first and second baffles each comprising a length which is about equal to one-fourth the inner circumference of the cylindrical vessel wall, the first and second baffles each being about the same distance down in the vessel from the top of the vessel wall, and the first and second baffles being circumferentially spaced from one another by about a distance of one-fourth the inner circumference of the vessel wall.

7. The method of claim 1 wherein a second baffle is provided and wherein the cylindrical inner wall has a circumference and a diameter, the first and second baffles being circumferentially spaced from one another by about a distance of one-fourth the inner circumference of the vessel wall, the granular material being provided between the circumferentially spaced baffles and within a distance of less than about one-third the diameter of the inner wall from the inner wall.

8. The method of claim 1 further comprising:

providing a slurry conduit in fluid communication with the outlet, the slurry conduit being a tube sealingly attached to the vessel; and pumping the formed slurry through the slurry conduit.

9. The method of claim 8 wherein the formed slurry is pumped through the slurry conduit at a rate of equal to or greater than about sixteen feet per second.

10. The method of claim 1 wherein the fluid stream is injected into the vessel at a fluid injection rate, the method further comprising:

providing a slurry conduit in fluid communication with the outlet;

pumping the slurry through the slurry conduit at a slurry removal rate; and controlling the slurry removal rate and fluid injection rate to maintain a substantially constant volume of fluid and slurry within the vessel during the step.

11. The method of claim 1 wherein the fluid stream comprises water injected into the vessel at a water injection rate, and wherein the soil is provided at a soil provision rate, the soil provision rate and the water injection rate being together controlled to maintain a ratio of soil to water within the apparatus of from about 4:6 to about 6:4 during the mixing step.

12. A method for reducing contamination of a contaminated soil, comprising the following steps:

transporting the contaminated soil to within a slurry-forming apparatus;

transporting water to within the slurry-forming apparatus;

mixing the contaminated soil with the water in the slurry-forming apparatus to thereby form a contaminated soil slurry;

transporting the contaminated soil slurry from the slurry-forming apparatus to a separate bioreactor vessel through a first substantially closed conduit;

growing microbes within the slurry in the bioreactor vessel and removing the contaminant from the contaminated soil slurry to reduce a concentration of a contaminant within the soil and to thereby reduce the contamination of the soil; and transporting the water from the bioreactor vessel to the slurry-forming apparatus through a second substantially closed conduit.

13. The method of claim 12 wherein the bioreactor vessel is initially partially filled with water, comprising:

cycling the water between the bioreactor vessel and the slurry-forming apparatus until the proportion of soil to water in the bioreactor is about 1:1.

14. The method of claim 13 further comprising:

providing a mixer in the bioreactor vessel, the mixer having outlet nozzles and fluid inlet conduits, the fluid inlet conduits being covered by self-cleaning screens, the fluid inlet conduits being in fluid communication with the second substantially closed conduit and the outlet nozzles being in fluid communication with the first substantially closed conduit;

providing the water from the bioreactor vessel to the second substantially closed conduit through the inlet conduits; and providing the soil-slurry from the first substantially closed conduit to the bioreactor vessel through the outlet nozzles.

15. The method of claim 12 further comprising:
transporting at least one of a buffer and an inocula of microorganisms to within the slurry-forming apparatus;
mixing at least one of the buffer and the inocula of microorganism with water in the slurry-forming apparatus to form a mixture; and
transporting the mixture to the bioreactor vessel.

16. The method of claim 12 wherein the step of transporting the soil to within the slurry-forming apparatus comprises conveying the soil to over the slurry-forming apparatus.

17. The method of claim 12 further comprising passing the contaminated soil through a screen prior to transporting the soil to within the slurry-forming apparatus.

18. The method of claim 12 wherein the slurry-forming apparatus is from about 100 yards to about one mile of the bioreactor vessel.

19. A soil remediation method wherein spillage of contaminated soil at a soil remediation site is substantially inhibited, the remediation site comprising a substantially central area surrounded by an outlying area, the method comprising the following steps:
defining a plurality of slurry-forming apparatus locations throughout at least one of the substantially central area and the outlying area;
defining a bioreactor vessel location within the central area;
providing at least one slurry-forming apparatus at the slurry-forming apparatus locations and utilizing the apparatus to form a contaminated soil slurry from contaminated soil substantially proximate to the apparatus;
providing a bioreactor vessel at the bioreactor vessel location;
transporting the contaminated soil slurry from the slurry-forming apparatus to the bioreactor vessel through a first substantially closed conduit, the transporting of the soil slurry through the substantially closed conduit substantially inhibiting spillage of contaminated soil between the outlying area and the substantially central area; and
partially filling the bioreactor vessel with water;
transporting the water from the bioreactor vessel to the one or more slurry-forming apparatuses through a second substantially closed conduit; and
cycling the water between the bioreactor vessel and the one or more slurry-forming apparatuses to provide a slurry-forming apparatuses water to form the contaminated soil slurry.

20. The remediation method of claim 19 wherein the contaminated soil proximate to the slurry-forming apparatus is within about 300 yards of the slurry-forming apparatus.

21. The remediation method of claim 19 wherein the bioreactor vessel is initially partially filled with water, comprising:
cycling the water between the bioreactor vessel and the one or more slurry-forming apparatuses until the proportion of soil to water in the bioreactor vessel is about 1:1.

22. A method for microbial decontamination of a contaminated soil, comprising the following steps:
washing the contaminated soil in a slurry-forming apparatus to form a slurry comprising a contaminated liquid and a substantially decontaminated soil, the washing in the slurry-forming apparatus comprising providing the contaminated soil within a vessel, the vessel having a cylindrical vessel wall, a downwardly-sloped floor joined to the vessel wall and a baffle along an interior surface of the vessel wall, the baffle comprising a longitudinal slope;
injecting water into the vessel through a fluid inlet, the water being directed downwardly by the longitudinal slope of the baffle, the water being thereby sent into a downward and curvilinear flow along the interior surface of the vessel wall;
mixing the soil with the water having a downward and curvilinear flow to wash the soil;
separating the substantially decontaminated soil from the contaminated liquid;
providing the separated contaminated liquid within a bioreactor; and
microbial decontamination of the contaminated liquid to reduce a contaminant concentration with the liquid.

23. A method for microbial decontamination of a contaminated soil, comprising the following steps:
providing the contaminated soil within a vessel, the vessel having a cylindrical vessel wall, a downwardly-sloped floor joined to the vessel wall and a baffle along an interior surface of the vessel wall; the baffle comprising a longitudinal slope;
injecting water into the vessel through a fluid inlet, the water being directed downwardly by the longitudinal slope of the baffle, the water being thereby sent into a downward and curvilinear flow along the interior surface of the vessel wall;
mixing the soil with the water having a downward and curvilinear flow to wash the soil and to form a slurry comprising a contaminated liquid and a substantially decontaminated soil;
separating the substantially decontaminated soil from the contaminated liquid;
providing the separated contaminated liquid within a bioreactor; and
microbial decontamination of the contaminated liquid to reduce a contaminant concentration within the liquid.

24. A method for microbial decontamination of a contaminated soil, comprising the following steps:
washing the contaminated soil in a slurry-forming apparatus to form a slurry comprising a contaminated liquid and a substantially decontaminated soil;
separating the substantially decontaminated soil from the contaminated liquid;
transporting the contaminated liquid from the slurry-forming apparatus to a bioreactor vessel through a substantially closed conduit and;
microbial decontamination of the contaminated liquid to reduce a contaminant concentration within the liquid.

25. A method for forming and expelling a slurry, comprising the following steps:
providing a vessel, the vessel having a cylindrical vessel wall, a downwardly-sloped floor joined to the vessel wall and an outlet in about the center of the downwardly-sloped floor; the cylindrical vessel wall having an interior surface and a top;
providing a first baffle along the interior surface of the vessel wall; the first baffle comprising a longitudinal slope;
providing a fluid inlet to within the vessel;
injecting a fluid stream into the vessel through the fluid inlet, the fluid stream being directed downwardly by the longitudinal slope of the baffle, the fluid being thereby sent into a downward and curvilinear flow along the interior surface of the vessel wall;

providing a granular material in the vessel;

mixing the granular material with the fluid having a downward and curvilinear flow to form a slurry;

flowing the slurry through the outlet of the vessel to expel the slurry; and wherein the fluid stream comprises water injected into the vessel at a water injection rate, wherein the granular material is soil, and wherein the soil is provided at a soil provision rate, the soil provision rate and the water injection rate being together controlled to maintain a ratio of soil to water within the apparatus of from about 4:6 to about 6:4 during the mixing step.

* * * * *

UNITED STATES PATENT AND TRADEMARK OFFICE
CERTIFICATE OF CORRECTION

PATENT NO. : 6,207,055 B1
DATED : March 27, 2001
INVENTOR(S) : Ronald J. Satterfield, et al.

It is certified that error appears in the above-identified patent and that said Letters Patent is hereby corrected as shown below:

Column 1,
Line 40, replace "at.," with -- al., --.

Column 3,
Line 64, delete duplicate "forming" at the beginning of line 64.

Signed and Sealed this

Sixteenth Day of October, 2001

Attest:

NICHOLAS P. GODICI
*Attesting Officer*    *Acting Director of the United States Patent and Trademark Office*